United States Patent

Dooley

[15] 3,652,800

[45] Mar. 28, 1972

[54] DIGITAL PULSE TRANSMISSION THROUGH AN ANALOG TDM SWITCHING SYSTEM

[72] Inventor: Gerald F. Dooley, Galion, Ohio

[73] Assignee: North Electric Company, Galion, Ohio

[22] Filed: May 27, 1970

[21] Appl. No.: 40,826

[52] U.S. Cl. ........................................................ 179/15 BA

[51] Int. Cl. ........................................................ H04j 3/06

[58] Field of Search ........................ 179/15 A, 15 BS, 15 BA; 340/173; 325/38 A

[56] References Cited

UNITED STATES PATENTS

| | | | |
|---|---|---|---|
| 3,461,245 | 8/1969 | Johannes et al. | 179/15 BS |
| 3,093,815 | 6/1963 | Karnaugh | 340/173 A |
| 3,535,450 | 10/1970 | Vollmeyer | 179/15 BS |
| 3,261,001 | 7/1966 | Magnin | 179/15 BA |

*Primary Examiner*—Kathleen H. Claffy
*Assistant Examiner*—David L. Stewart
*Attorney*—Johnson, Dienner, Emrich, Verbeck & Wagner

[57] ABSTRACT

A time division multiplex switching system for transmission of digital pulses from asynchronous pulse transmitters in which each incoming data stream is buffered until the occurrence of an assigned time slot. During such assigned time slot, either the data pulses or stuff pulses are transmitted across the switching matrix in a three level code. The data pulses are then detected, separated from the stuff pulses, and buffered. The original input pulse rate is regenerated and the data pulses are transmitted to the digital receiver at approximately such rate.

15 Claims, 20 Drawing Figures

INVENTOR
GERALD F. DOOLEY

BY Johnson, Dienner, Emrich, Verbeck & Wagner
ATTORNEYS

INVENTOR
GERALD F. DOOLEY

BY Johnson Dienner Emrich Verbeck & Wagner
ATTORNEYS

INVENTOR
GERALD F. DOOLEY

BY Johnson, Dienner, Emrich, Verbeck & Wagner
ATTORNEYS

INVENTOR
GERALD F. DOOLEY

BY Johnson Dienner Emrich Verbeck & Wagner

ATTORNEYS

INVENTOR
GERALD F. DOOLEY

BY Johnson Dienner Emrich Verbeck & Wagner
ATTORNEYS

DIGITAL PULSE TRANSMISSION THROUGH AN ANALOG TDM SWITCHING SYSTEM

BACKGROUND OF THE INVENTION

1. Field of the Invention

This invention relates to time division switching systems having digital pulse stream transmission capabilities.

2. Description of the Prior Art

In an analog time division switching system of the type disclosed in U.S. Pat. No. 3,088,998 which issued to A. K. Bergmann et al. on May 7, 1963, band limited analog signals are periodically sampled on an incoming terminal and gated to the selected output terminal where they are filtered to regenerate the analog signal, thereby providing a voice connection between the selected terminals. The principles of time division switching and time division multiplexing, now conventional in the art, divide time into discrete time slots during which information pulses are passed between a transmitter, or source, and a receiver. In time division multiplexing, each terminal has a fixed assignment to a particular time slot. In time division switching, time slot assignment is variable in accordance with the desired connection. Generally, a primary memory means sequentially accessed provides the means for the assignment of the time slots to particular terminals.

The time sampling principle, now conventional in the art, is a means whereby a continuous band limited analog signal can be periodically sampled and regenerated from the sampled values with theoretically zero distortion. Using this principle, a form of pulse amplitude modulation (PAM), the periodic sampling rate must be greater than twice the highest frequency component of the analog signal being passed, so that distortion-free transmission will result. Thus, time division switching systems, generally implemented for analog switching have an inherent bandwidth limitation, particularly with respect to high speed digital signals, such as, for example, digital signals which are in the order of 50 kilobits per second.

One means of extending the capability of an analog time division switching matrix to switch high-speed digital pulse stream consists of band limiting the digital pulse streams; that is, passing the signals through a low pass filter, then treating the filtered digital pulse stream as an analog signal. If one considers the predominate energy in a digital pulse stream of data rate R to be contained within a bandwidth of 2R, and if the digital pulse stream is filtered through a low pass filter of bandwidth 2R, the stream may then be sampled at a sampling rate of 4R by assigning multiple time slots. By way of example, a simple, single-highway, analog time division switching matrix may utilize a sampling rate of 12.5 kilohertz and 48 time slots. Such system can accommodate 48 simultaneous voice connections; that is, one connection per time slot. To switch a 50 kilobit per second digital pulse stream, the pulse stream would first be band limited to within 100 kilohertz and then sampled at a 200 kilohertz rate by assigning 16 evenly spaced time slots, as for example, time slots 2, 5, 8, 11, 14, 17, 20, 23, 26, 29, 32, 35, 38, 41, 44 and 47. This system could handle only three simultaneous 50 kilobit per second connections, or one-sixteenth of its capacity for voice connections.

In an all digital time division switching system, one of the major system problems is synchronization of a multitude of digital sources. One method which has been proposed consists of using a common master clock signal transmitted to all digital sources for synchronization purposes. This system has several undesirable features. First, it requires a rather expensive master clock of a high accuracy and a timing subsystem to distribute this synchronization clock. Secondly, variations in the transmission parameters disrupt the perfect synchronization of all digital sources. It is highly desirable therefore to be able to switch digital sources without requiring synchronization of all the digital sources in the switching network.

SUMMARY OF THE INVENTION

The novel arrangement of the present disclosure is operable to transmit digital information through an existing analog time division switching matrix. To incorporate digital switching capability in the analog switching system, an analog transmitter circuit and an analog receiver are replaced by a digital transmitter circuit and a digital receiver circuit, respectively. The digital transmitter circuit includes means for buffering the incoming pulses from a digital transmitter and storing the data pulses in the sequence of arrival until the occurrence of an assigned time slot indicated by the read clock pulse (time slot sampling pulse). During the occurrence of an assigned time slot, the next pulse to be switched is taken from the buffer, and passed from the digital transmitter circuit through a PAM interhighway arrangement to the digital receiver circuit, where it is again buffered and transmitted out to the digital receiver at a uniform rate which is determined by the rate of the pulses input to the digital receiver circuit.

If the basic sampling rate of the analog time division switching matrix is 12.5 kilohertz, that is, a frame repetition rate of 12,500 frames per second, a pulse stream of up to, but not exceeding 12.5 kilobits per second, can be switched by assigning one time slot per frame to a digital connection. Pulse rates between 12.5 kilobits per second and up to, but not exceeding 25 kilobits per second, can be switched by assigning two time slots per frame; and pulse rates from 37.5 kilobits per second and up to, but not exceeding 50 kilobits per second can be switched by assigning four time slots per time frame. To accommodate asynchronization between the time slot sampling rate and the digital transmitter pulse rate, there will be occurrences of an assigned time slot when there is no pulse to be switched from the digital transmitter circuit to the digital receiver circuit. During this time slot, a stuff pulse is generated by the digital transmitter circuit, which indicates the absence of a data or information pulse to the digital receiver circuit.

It is the function of the digital transmitter circuit to receive pulses from a digital transmitter and store such pulses in the received sequence until the occurrence of an assigned time slot. During an assigned time slot, the digital transmitter circuit will pass either a received data pulse or a stuff pulse through the inter-highway matrix to the appropriate digital receiver circuit. It is the function of the digital receiver circuit to receive the pulses from the time division matrix and reject the stuffing pulses, and to pass the information pulses to a digital receiver at a uniform rate.

It is therefore an object of this invention to extend the capability of existing analog time division switching matrices to switch high-speed digital pulse streams without a severe penalty as to system capacity, and specifically by reducing the number of time slots required by the digital connection.

It is a further object of this invention to provide a means of switching a plurality of asynchronous digital pulse streams, that is, interconnecting any two asynchronous sources and destinations in a desired connection, without requiring complex synchronizing circuitry.

DESCRIPTION OF A PREFERRED EMBODIMENT

System Arrangement

Figure 1:
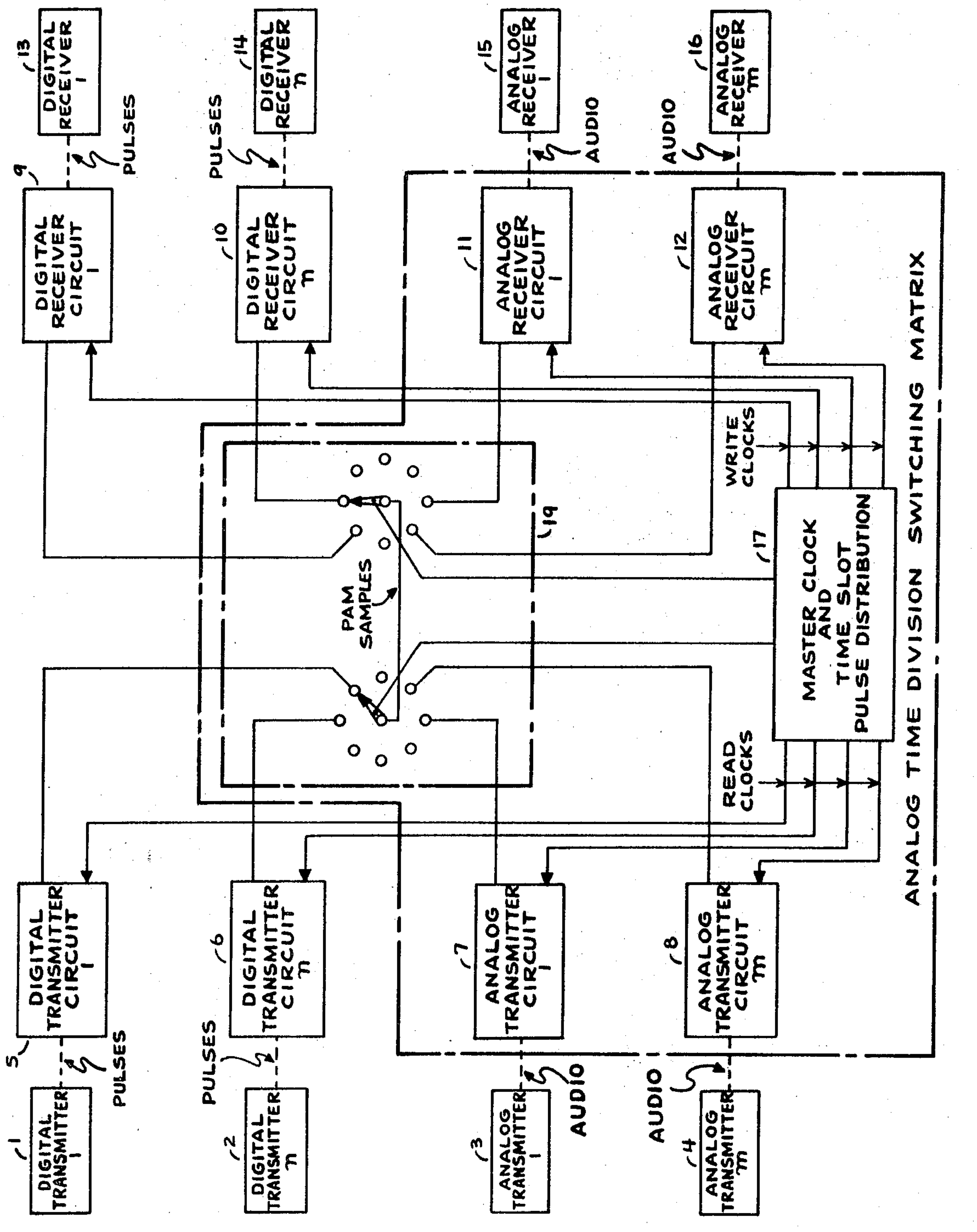
FIG. 1 is a block diagram of a pulse switching system in accordance with the present invention.

The addition of a digital switching capability to an analog time division switching matrix in accordance with the present invention is shown in block diagram form in FIG. 1. The portion shown within the dotted lines represents an existing analog time division switching matrix in which PAM samples are passed from an analog transmitter circuit 7, 8 to an analog receiver circuit 11, 12, in accordance with the desired connections, by means of a time slot memory which drives the time slot pulse distribution circuitry 17. To incorporate a digital switching capability, an analog transmitter circuit and an analog receiver circuit are replaced by a digital transmitter circuit 5, 6 and a digital receiver circuit 9, 10 respectively.

Each digital transmitter circuit, such as 5, 6, receives pulses from an associated digital transmitter, such as 1, 2 and stores the received pulses until the occurrence of an assigned time slot. During an assigned time slot, which as will be shown may be one or more time slots randomly assigned by distribution circuitry 17 for use by a digital, such as transmitter circuit 5, 6, such transmitter circuit will pass either a received data pulse or a stuff pulse (to be described) through the inter-highway arrangement 19 to a selected one of the digital receiver circuits 9, 10. The selected one of the digital receiver circuits such as 9, 10 receive the pulses from the time division inter-highway arrangement 19 and reject the stuff pulses and further pass the information pulses to an associated digital receiver such as 13, 14 at a uniform rate.

Digital Transmitter Circuits

Figure 2:
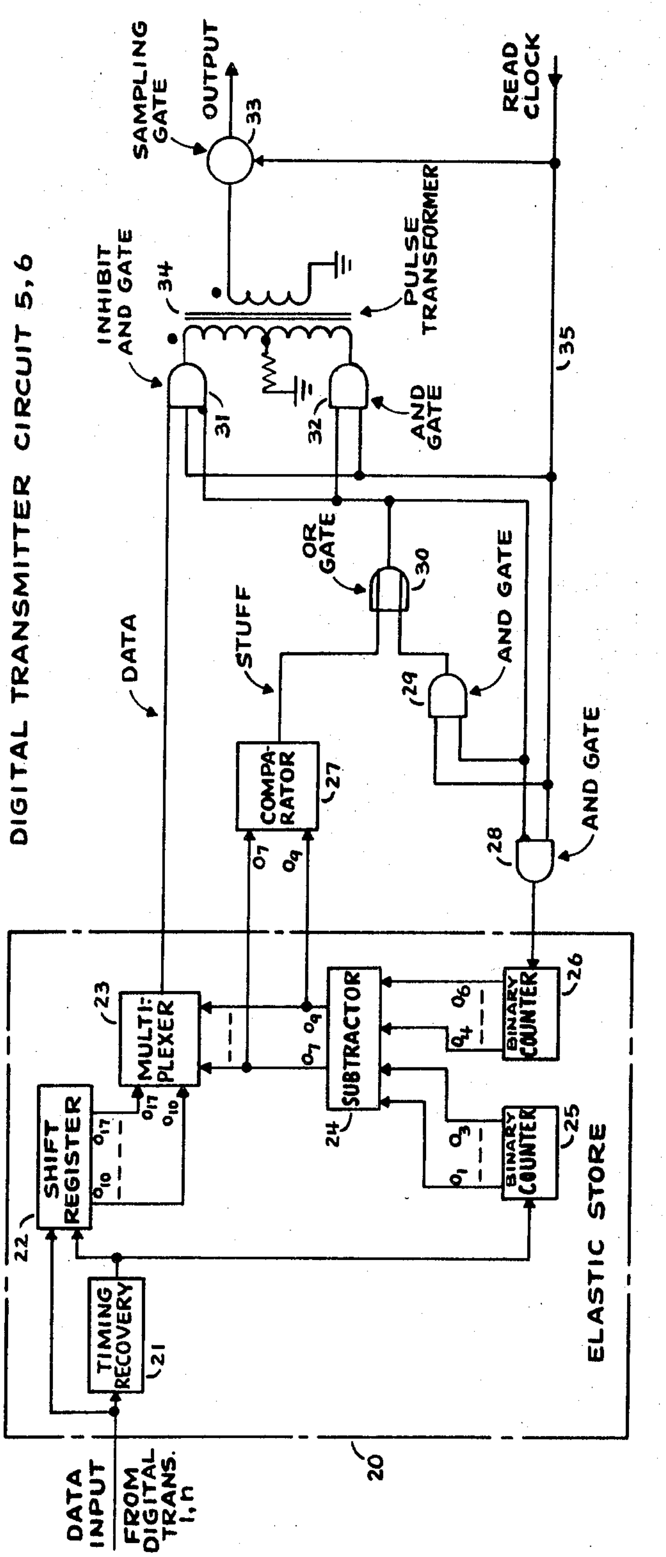
FIG. 2 is a detailed block diagram of the digital transmitter circuit.

A digital transmitter circuit, such as 5, 6 in one embodiment of this invention, is shown in FIG. 2. In such embodiment, information pulses from the digital transmitter 1, 2 are written into an elastic store 20 which will be described in detail later. The elastic store 20 buffers the information pulses until the occurrence of an assigned time slot. During the occurrence of an assigned time slot indicated by a pulse on the read clock line 35, if there is an information pulse stored in the elastic store 20, it will be read from the elastic store and transmitted through the time division inter-highway arrangement 19 (FIG. 1) to a selected digital receiver circuit, such as 10. If there are no information pulses stored in the elastic store 20 during the occurrence of the assigned time slot, a stuff pulse is generated and transmitted through the time division inter-highway arrangement 19 to the digital receiver circuit 10.

With reference to FIG. 2, a comparator 27 monitors the number of information pulses received by the elastic store 20 and not yet transmitted to the digital receiver circuit 10 and, when there are no pulses stored, generates a stuff signal to OR gate 30. It is the purpose of OR gate 30 and AND gate 29 to avoid switching from a stuff pulse to an information pulse in the middle of a time slot interval. That is, if at the beginning of a time slot interval there are no pulses in the elastic store 20, the stuff pulse will be transmitted for the duration of the time slot, even if an information pulse is written into the elastic store during the time slot. Normally, when the read clock is not present, the output of OR gate 30 follows the stuff signal output of the comparator 27. The output of OR gate 30 is fed back as one of the inputs to AND gate 29. If a read clock occurs at this time, the second input to AND gate 29 becomes active and thus, the output of AND gate 29 becomes active. If the stuff signal from the comparator 27 should go away before the end of the read clock pulse, the output of OR gate 30 will be kept up for the duration of the read clock, thus maintaining the stuff pulse which was being transmitted and guaranteeing the transmission of a stuff pulse for the duration of the read clock in the assigned time slot interval. If there are no information pulses stored in the elastic store during the time slot interval, the output of the comparator 27 and the OR gate 30 is high, and AND gate 28 prevents the read clock from incrementing the binary counter 26, thus preventing reading from the elastic store 20.

In order that the digital receiver circuit 10 may distinguish between information pulses and stuff pulses, a three level signal is generated at the output of the sampling gate 33 of the digital transmitter circuit 5. It is this output signal which passes through the time division interhighway arrangement 19 to the selected one of the digital receiver circuits 10. This three level signal consists of a positive voltage (+V volts) indicating a binary "1" information pulse, 0 volts indicating a binary "0" information pulse, and a negative voltage (−V volts) indicating a stuff pulse. This three level signal is generated by the combination of encoder means comprising an inhibit AND gate 31, an AND gate 32, and a pulse transformer 34.

More specifically, if an information pulse is to be transmitted during the time slot, i.e., the stuff level and output of OR gate 30 is low, inhibit AND gate 31 is enabled and AND gate 32 is disabled. If a binary "1" information pulse is to be transmitted, the output of inhibit AND gate 31 is positive and the output of AND gate 32 is ground. Thus, a positive voltage is presented to the primary of transformer 34, which generates a positive voltage on the secondary of pulse transformer 34.

If a binary "0" information pulse is to be transmitted, the output of inhibit AND gate 31 is ground, the output of AND gate 32 is ground and no voltage is presented to the primary of pulse transformer 34. Consequently, a 0 voltage is generated on the secondary of pulse transformer 34.

If a stuff pulse is to be transmitted during the time slot, i.e., the stuff signal and the output of OR gate 30 is high, inhibit AND gate 31 is disabled and AND gate 32 is enabled. The output of inhibit AND gate 31 therefor is ground, and the output of AND gate 32 is positive. With the polarity indicated on pulse transformer 34, a negative voltage is generated across the secondary winding of transformer 34 for sampling by a read clock pulse via sampling gate 33 and transmission over the output circuit to the digital receiver circuit 10.

Figure 4:
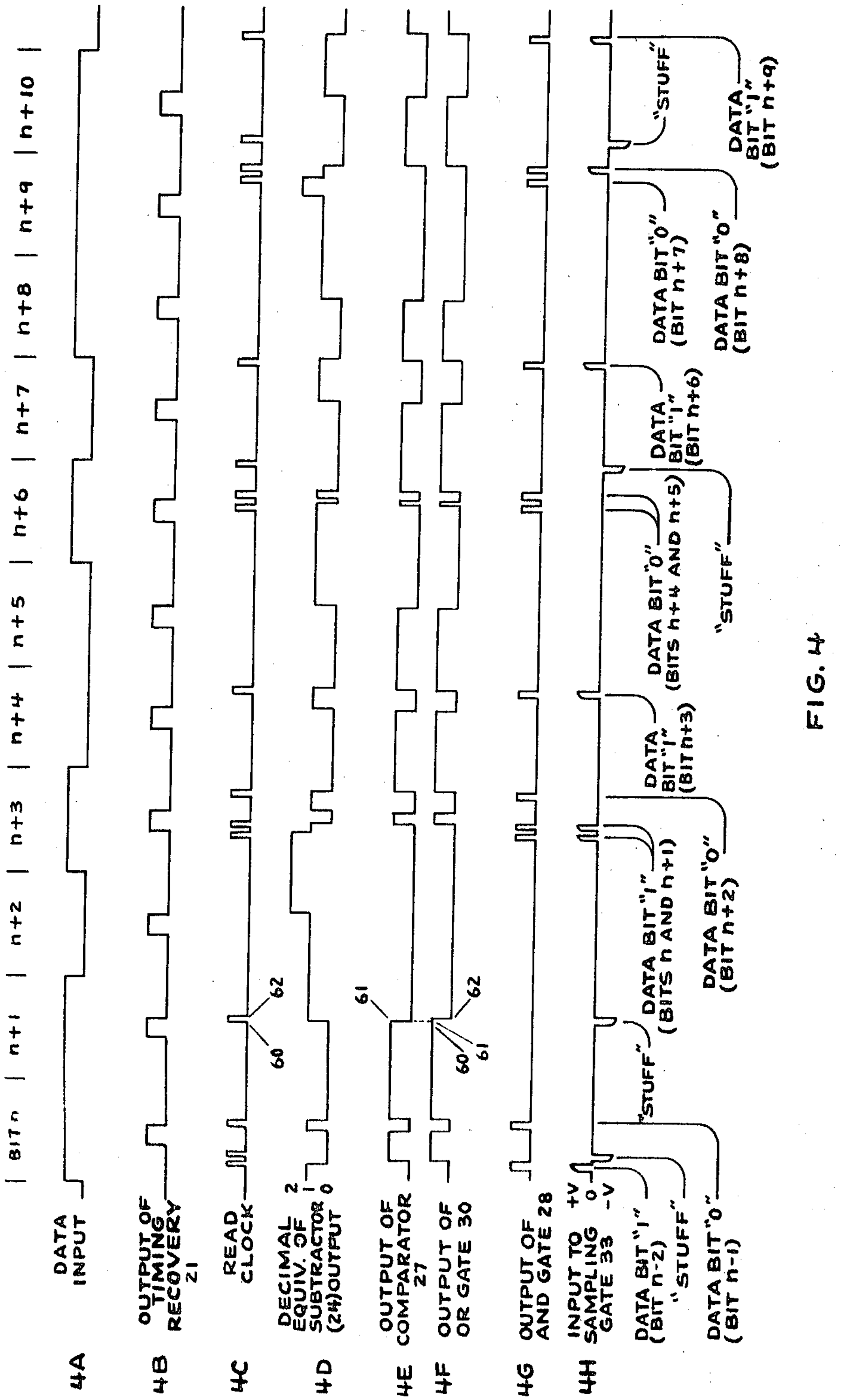
FIG. 4A is a waveform of the data input to the digital transmitter circuit.
FIG. 4B is a waveform of the output of the clock restorer in the digital transmitter circuit.
FIG. 4C is the waveform of the read clock going into the digital transmitter circuit from the time slot pulse distribution circuitry.
FIG. 4D is an illustration representing the decimal equivalent of the subtractor output within the digital transmitter circuit.
FIG. 4E is a waveform of the output of the comparator.
FIG. 4F is a waveform of the output of the OR gate which stretches the comparator waveform.
FIG. 4G is the waveform of the output of the stuff generating AND gate.
FIG. 4H is a waveform of the output of the sampling gate of the digital transmitter circuit.

The elastic store 20 comprises a timing recovery circuit 21, a shift register 22, a multiplexer 23, a subtractor 24, and two binary counters 25, 26. A timing recovery circuit, which may be of the type shown in U.S. Pat. No. 3,093,815 which issued to M. Karnaugh on June 11, 1963, extracts a timing pulse from the incoming signals input from the digital transmitter and generates, at its output, a clock waveform centered in the middle of the incoming information pulse interval. Such operation is depicted in FIG. 4B. This derived clock signal output of the time recovery circuit 21 is used to shift the information pulse input from the digital transmitter 1, 2 into the shift register 22 and to increment the binary counter 25 which counts the number of pulses written into the shift register 22.

Binary counter 25 in one embodiment used 3 bits of a 4 bit counter commercially available as Texas Instruments SN7493, which provides an indication in the binary code of the stored count in counter 25 over the three output conductors $0_1 - 0_3$ to a first input on subtractor 24.

The shift register 22 is a serial-in, parallel-out shift register consisting in one embodiment of eight stages, and commercially available as two Fairchild Circuits F930059. The information pulses incoming from the digital transmitter 1, for example, are written into the elastic store 20 by shifting them sequentially into the shift register 22 and simultaneously incrementing the binary counter 25.

Binary counter 26 which may be the same circuit as is used for binary counter 25 is incremented every time a pulse is read from the elastic store 20. The stored count in binary counter 26 is fed over output conductor $0_4 - 0_6$ in the binary code to a second input on subtractor 24.

Subtractor 24, which may be a circuit commercially available as two Fairchilds F930459, provides a signal output in binary code over conductors $0_7 - 0_9$, the value of which indicates the difference between the counts in binary counters 25, 26. In the embodiment of FIG. 2 the difference value is used to indicate to the multiplexer 23 the particular cell (or binary flip-flop) in the shift register 22 which contains the next information pulse in the incoming sequence which has not yet been read out.

The multiplexer 23 is an electronic commutator which in one embodiment comprises a circuit commercially available as Fairchild F930959 and Fairchild 994659 and which has one input (a steering circuit input) connected over conductor $0_7$–$0_9$ to the binary output of subtractor 24, and a second input connected over conductor $0_{10}$–$0_{17}$ to each cell of shift register 22. Multiplexer 23 selects the bit in the shift register 22 indicated by the output of the subtractor 24 as the information pulse which is to be read next from the shift register 22.

A comparator circuit 27 compares the output of the subtractor 24 to zero. In the present embodiment, if there are no information pulses stored in the elastic store 20, the output of subrractor 24 on conductors $0_7$–$0_9$ will be all binary "0's", and with binary "0" on conductors $0_7$–$0_9$ the output of comparator 27 will be high, indicating a requirement for a stuff signal. Whenever there are information pulses stored in the elastic store, the output conductors $0_7$–$0_9$ of subtractor 24 will so indicate, and the output of comparator 27 will be low, indicating that a stuff signal is not required.

It will be seen therefor that whenever the number of data pulses in the shift register 22 as indicated by the subtractor 24 is less than a predetermined number (in the present example, less than one-i.e. zero) the comparator 27 will effect generation of a stuff pulse. It will be further observed that by connecting different ones of the output conductors as inputs to comparator 27 there will be a corresponding change in the value of the predetermined number at which a stuff pulse is generated.

The waveforms shown in FIGS. 4A, 4B, 4C and 4D graphically depict the operation of the elastic store 20, and the manner in which the timing recovery circuit 21 inputs the digital pulses from the digital transmitter into shift register 22, and the manner in which the subtractor 24 operates to indicate to multiplexer 23 the number of pulses stored in shift register 22 at any given instant.

The illustrated waveforms indicate, in FIGS. 4A and 4B, an incoming pulse rate which is slightly less than four times the basic sampling rate of the analog time division switching matrix 19. The waveforms shown in FIG. 4C depict the occurrence of four time slots per time frame which, for example, may include the time slots 1, 2, 5 and 16 arbitrarily assigned by the distribution circuitry 17. The fact that the time slots need not be assigned with a uniform spacing (i.e., uniform time spacing between the time slots in each frame assigned to the connection by distribution circuitry 17) is a distinct advantage of the present invention.

The waveforms shown in FIGS. 4E and 4F depict the operation of OR gate 30 and AND gate 29, and the manner in which a stuff signal is extended in time in the event that an information pulse is written into the elastic store 20 during a time slot interval in which a stuff pulse is being generated. With reference to these figures, it is assumed that the beginning of a time slot pulse occurs at instant 60 and that at such instant, there are no information pulses stored in the elastic store. As a result, the output of the comparator 27 will be high, and a stuff pulse is transmitted to the digital receiver circuit through sampling gate 33. At instant 61, an information pulse is written into the elastic store 20 causing the output of comparator 27 to go low. However, since the read clock 35 is still present, the output of AND gate 29 will remain high and hence the output of OR gate 30 will remain high, continuing the stuff pulse for the duration of the time slot pulse. At instant 62, the end of the time slot pulse, read clock 35 falls, the output of AND gate 29 drops low, and the output of OR gate 30 drops low.

FIG. 4G depicts a waveform of the output of AND gate 28 which increments the binary counter 26 in the elastic store. This figure shows how the incrementing of counter 26 is inhibited whenever the stuff signal is present at the output of OR gate 30. Whenever the inhibit input from OR gate 30 to AND gate 28 is high, the read clock pulses are not passed through the gate.

FIG. 4H shows the resultant waveform generated for output over sampling gate 33 in response to the inputs shown in FIGS. 4A and 4C. The output waveform is passed through the time division switching matrix 19 (PAM interhighway arrangement) in FIG. 1 to the selected one of the digital receiver circuit which is assumed to be receiver 10 in the present example.

Digital Receiver

Figure 3:
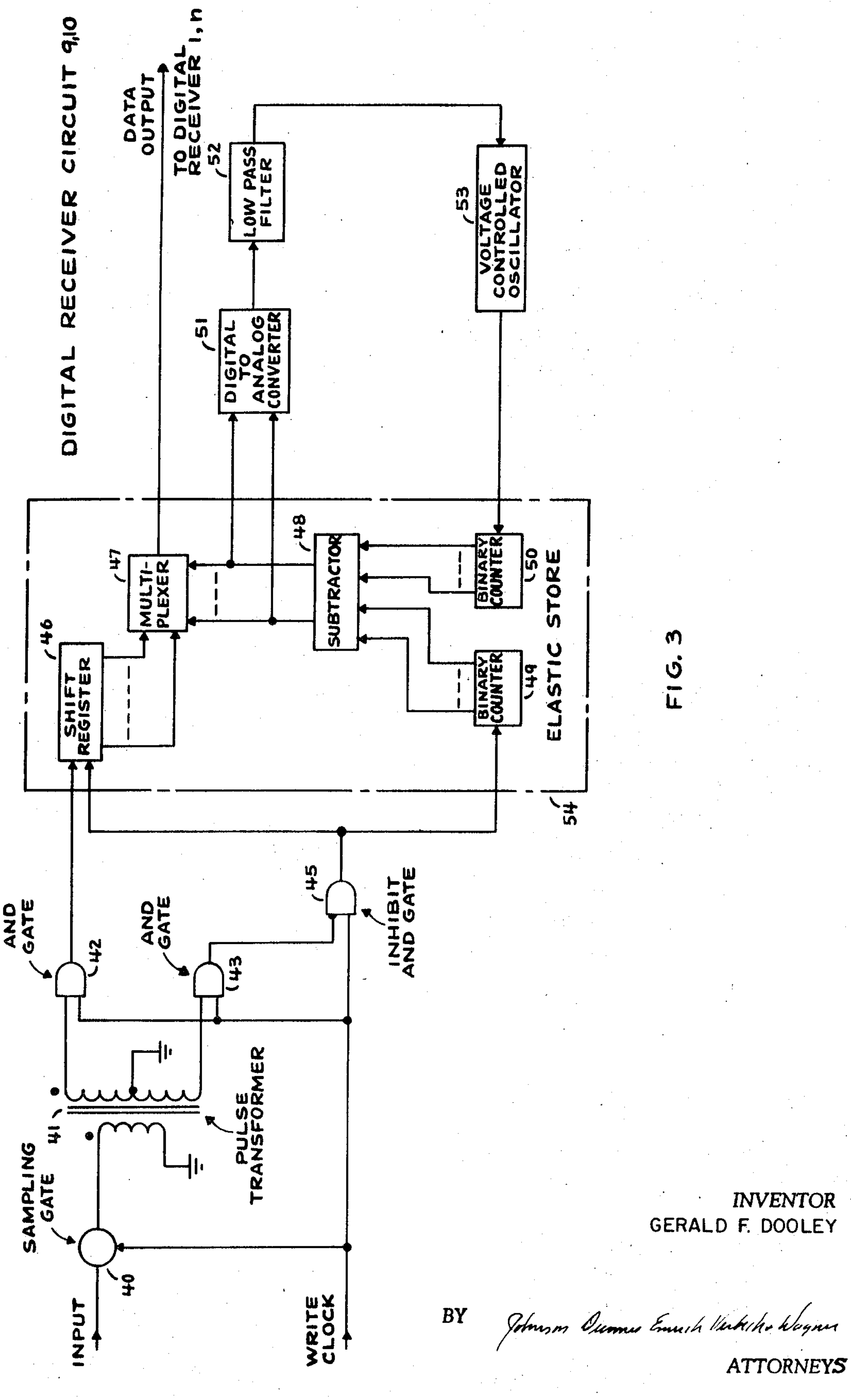
FIG. 3 is a detailed block diagram of the digital receiver circuit.

FIG. 3 shows one embodiment of the digital receiver circuit 10 of the present invention. As each pulse is received from the digital transmitter circuit 5 (i.e., which will be during the assigned time slots shown in FIGS. 4C and 5A of the present example) the write clock signal input to sampling gate 40 effects passage of the decoder means including input signals to the pulse transformer 41 and gates 42, 43 and 45. A positive pulse, input to pulse transformer 41, due to the indicated polarity of the pulse transformer, presents a positive signal to AND gate 42 and a negative signal to AND gate 43. This condition presents a binary "1" information pulse on the output of AND gate 42 to the input of the elastic store 54. If the output of sampling gate 40 was 0 volts during the write clock interval, a zero input is fed to AND gates 42 and 43, thus presenting a binary "0" information bit to the input of the elastic store 54. If the output of sampling gate 40 is a negative pulse, a negative input is presented to AND gate 42 and a positive input is presented to AND gate 43. This positive output of AND gate 43 inhibits the write clock from passing through inhibit AND gate 45 and writing a pulse into the elastic store 54.

For a desired connection between a particular digital transmitter circuit, such as circuit 5 (FIG. 1), and a particular digital receiver circuit, such as 10, the read clock presented to the digital transmitter circuit and the write clock presented to the digital receiver circuit are synchronized. During the assigned time slots when the illustrated connection is established by the analog time division matrix, coincident pulses are presented on the read clock input to digital transmitter circuit 5 and the write clock input to digital receiver circuit 10.

The elastic store in the digital receiver circuit, shown in FIG. 3, is similar to the elastic store in the digital transmitter circuit shown in FIG. 2, the major difference being the absence of a timing recovery circuit, such as 21, in the digital transmitter circuit. The timing recovery circuit is unnecessary since a write clock for the elastic store 54 is provided by the write clock from the analog time division switching matrix. Elastic store 54 operates in the same manner as the elastic store 20 in the digital transmitter circuit; that is, the pulse is written into the elastic store 54 by shifting the pulse into a shift register 46 and incrementing a binary counter 49. A pulse is read out of the elastic store by decrementing binary counter 50 to change the output of subtractor 48 and thereby enable multiplexer 47 to select the corresponding pulse in shift register 46 for transmission over the data output circuit.

Figure 5:
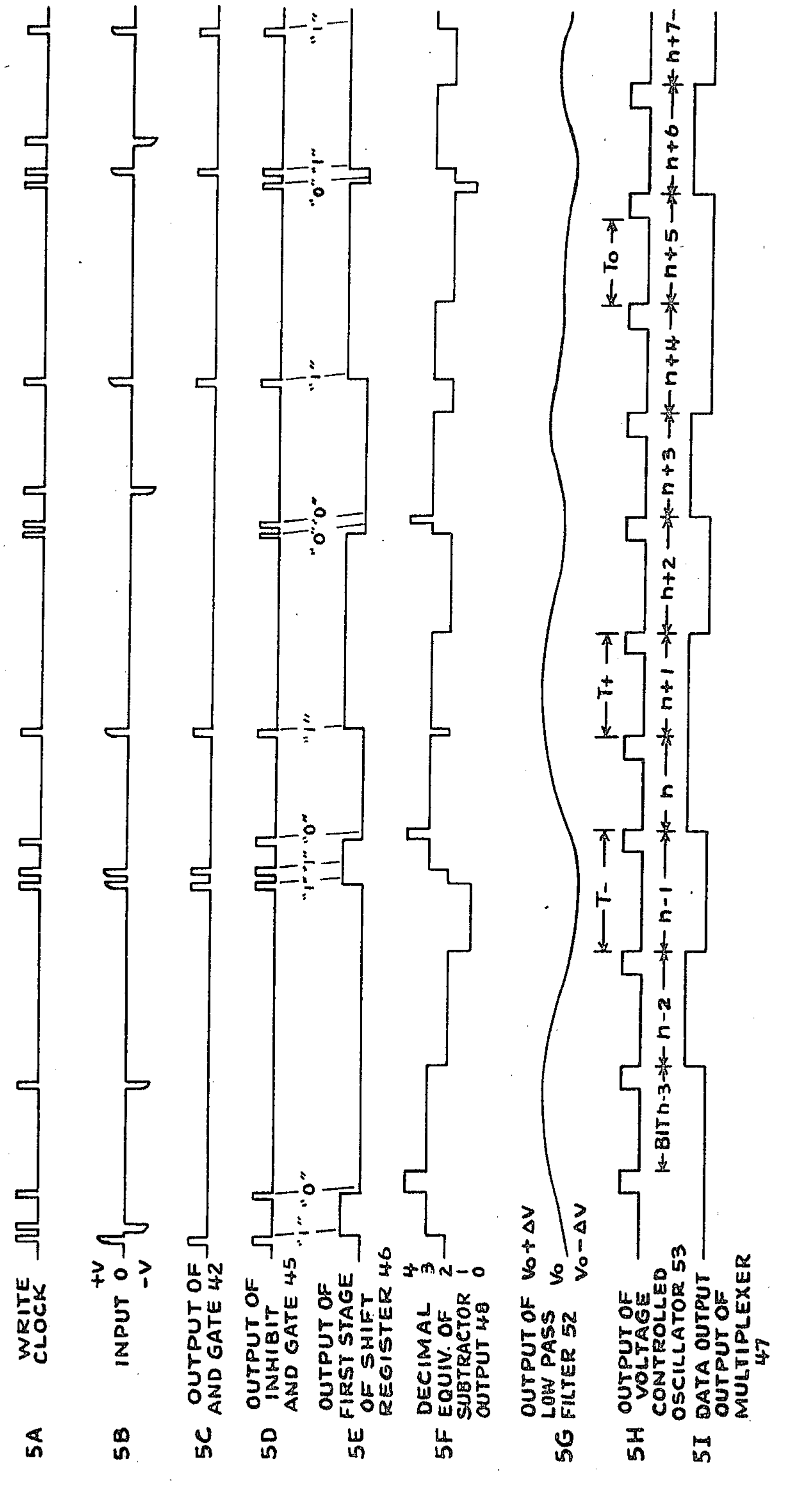
FIG. 5A is a waveform of the write clock input to the digital receiver circuit from the time slot pulse distribution circuitry.
FIG. 5B is a waveform of the input to the sampling gate of the digital receiver circuit.
FIG. 5C is a waveform of the output of the data detection AND gate in the digital receiver circuit.
FIG. 5D is the waveform of the output of the stuff detecting inhibit AND gate in the digital receiver circuit.
FIG. 5E is a waveform of the output of the first stage of the shift register in the elastic store.
FIG. 5F is an illustration representing the decimal equivalent of the output of the subtractor.
FIG. 5G is a waveform of the output of the low pass filter which drives the voltage controlled oscillator.
FIG. 5H is a waveform of the output of the voltage controlled oscillator.
FIG. 5I is a waveform of the output of the multiplexer in the digital receiver circuit.

The manner in which the digital receiver circuit discriminates between information pulses and stuff pulses can be seen in FIGS. 5A, 5B, 5C, 5D, and 5E. FIG. 5A depicts the waveform of the write clock which, as mentioned, is synchronous with the read clock depicted in FIG. 4C. The waveform of the pulse input presented to the digital receiver circuit is depicted in FIG. 5B. Whenever a positive voltage or zero voltage, as shown in FIG. 5B, is present, coincident with the write clock, the write clock is passed through inhibit AND gate 45 and writes a binary "1" or a binary "0" information pulse into the elastic store. Whenever a negative voltage is present, as indicated in FIG. 5B, coincident with a write clock, inhibit AND gate 45 prevents the write clock from writing a pulse into the elastic store. Thus, no pulses are written into the elastic store during a stuffing interval.

Because every assigned time slot does not contain an information pulse, the precise clock rate of the incoming information pulse stream is lost. It is the function of the digital receiver circuit 10, therefore, to reconstruct this incoming data rate. That is, it must take the information pulses written into the elastic store 54 and transmit such pulses out to the digital receiver 14 at as close to a uniform rate as possible. To perform this function, the digital-to-analog converter 51, low pass filter 52, and voltage control oscillator 53 are utilized. The digital-to-analog converter 51 monitors the output of the subtractor 48 and generates a voltage output proportional to the binary value of the count output from subtractor 48. This waveform is then filtered or smoothed through the low pass filter 52, and presented as a control voltage for the voltage control oscillator 53. As this input becomes more positive, the output of the voltage control oscillator 53 increases in frequency. If the input to the voltage control oscillator 53 becomes less positive, the output frequency decreases. The pulse output of the voltage control oscillator 53 then acts as the read clock pulses to the elastic store 54 which determine the rate of pulse transmission from the shift register 46 by multiplexer 47 to the digital receiver 14. The digital-to-analog converter 51, low pass filter 52, and voltage control oscillator 53 operate in conjunction with the counter 50 and a subtractor 48 as a phase locked feedback control loop. Thus, as the number of information pulses stored in the elastic store increases, the output of subtractor 48 causes a more positive voltage to be generated at the output of the digital-to-analog converter 51. This results in an increased frequency of the output of the voltage control oscillator 53 which tends to read the information pulses out of the elastic store at a faster rate, thus decreasing the average number of information pulses stored in the elastic store. If the average number of information pulses stored in the elastic store becomes less than a predetermined number (in the present example less than one-i.e. zero) then, the binary count presented by the subtractor to the digital-to-analog converter 51 will be correspondingly decreased, causing a drop in the output voltage of the digital-to-analog converter 51 which, when filtered, causes the output frequency of the voltage control oscillator 53 to decrease and, thus, to read the information pulses out of the elastic store 54 at a slower rate. This feedback action strives to maintain a constant average number of information pulses stored in the elastic store and consequently a uniform output pulse rate. This operation is depicted by the waveforms in FIGS. 5F, 5G, 5H, and 5I.

FIG. 5F depicts the decimal equivalent of the output of subtractor 48, and FIG. 5G shows the waveform of the output of the low pass filter 52 which is proportional to the output of the digital-to-analog converter 51.

As the output of the subtractor 48 drops toward zero, the output voltage of the low pass filter 52 decreases, thus causing the pulse repetition period of the output of the voltage control oscillator 53 to increase as indicated in FIG. 5H as T−. As the output of subtractor 48 increases, the output of the low pass filter 52 increases to reduce the pulse repetition period of the output of the voltage control oscillator indicated in FIG. 5H as T+. In the example being described, the nominal or average output pulse repetition period occurs when the average number of information pulses stored in the elastic store averages between 2 and 3. This is indicated in FIG. 5H as $T_o$. The output of the digital receiver circuit 10 which is transmitted to the digital receiver 14 with such input is shown in FIG. 5I.

The advantages of this invention can now be seen. With reference to the previous stated example of an analog time division switching matrix implemented with a 12.5 kilohertz sampling rate and 48 time slots, a 50 kilobit per second digital connection now requires only four time slots or 4 times the capacity of a voice connection. This is a four-to-one reduction over the previously stated example.

Another advantage of this invention is that it does not require a uniform spacing of the time slots for a digital connection. Thus, the time slots assigned to the 50 kilobit per second digital connection can be any four time slots within the exemplary 48 time slot frame.

Another advantage of the present invention is that there is no necessity for synchronization between the switching matrix and the digital transmitters 1 and 2. This is a result of the buffering action of the elastic stores 20 in the digital transmitter circuit 5 and 6.

A further advantage of the present invention is that digital switching capability is introduced into an analog time division switching matrix by simple module replacement. That is, the analog transmitter circuit 7 and 8 is replaced by a digital transmitter circuit 5 or 6 and the analog receiver circuit 11 or 12 is replaced by the digital circuit 9 or 10.

With reference to FIG. 1, within the capacity limitations of the analog time division switching matrix, any mixture of *n* digital circuits and *m* analog circuits can be implemented, even to the degree of a complete digital matrix (that is, *m* becomes zero or no analog circuits).

While other methods of retiming digital pulse streams have been previously proposed, distinguishing factors of the present invention are as follows:

1. The retimed pulse stream is a three-level pulse stream as opposed to a binary pulse stream used in prior systems. This allows any or all pulses to be stuff pulses.

2. Because any of the retimed pulses can be stuff pulses, a greater range of pulse rates can be retimed. That is, any rate from zero pulses per second up to the maximum retiming clock rate, which rate is equal to the product of the basic time slot sampling rate and the number of time slots assigned to the connection.

3. The primary application as a switching system does not require any framing information to be introduced into the retimed pulse streams.

While what is described is regarded to be a preferred embodiment of the invention, it will be apparent that variations, rearrangements, modifications and changes may be made therein without departing from the scope of the present invention as defined by the appended claims.

I claim:

1. In a digital time division switching system in which data pulses are transmitted from digital transmitter means to digital receiver means in at least one assigned time slot of a cyclic pattern, said digital transmitter means having buffer means for storing the data pulses input from a digital pulse source, means for selectively effecting transmission of said data pulses from said buffer means during said time slot, including stuff means for generating a stuff pulse in such time slot whenever the number of said stored data pulses in said buffer means during said time slot are less than a given number, and encoder means for providing coded signals having discrete predetermined electrical characteristics for each different data signal as input thereto and coded signals for the input stuff pulses having an electrical characteristic which is different than the electrical characteristics of the coded data signals, and circuit means including detection means in each digital receiver means responsive to said predetermined and different electrical characteristics to identify said stuff pulses and said data pulses as received, and means controlled by said detection means for regenerating only the data pulses at a uniform pulse rate.

2. A digital time division switching system as set forth in claim 1 in which a plurality of time slots of a cycle are assigned for use in transmission of the digital information over the system, and in which the time slots assigned to such transmission are non-uniformly spaced relative to each other in each cycle.

3. A digital time division switching system as set forth in claim 1 which includes means in said encoder means for coding said stored data pulses and said stuff pulses for transmission to said digital receiver means in a three-level pulse signal code, level one being provided for a stored logic 1 data pulse, level two being provided for a stored logic 0 data pulse, and level three being provided for a stuff pulse.

4. In a digital time division switching system in which data pulses are transmitted from digital transmitter means to a digital receiver means in at least one assigned time slot of a cyclic pattern, said digital transmitter means having elastic store means for processing the data pulses input from a digital pulse source, said elastic store means including a shift register for storing the input data pulses, readout means for reading the stored data pulses out from said shift register during said assigned time slot, indicating means for continuously providing an indication of the specific data pulse in said shift register to be read out by said readout means, and means including said indicating means for selectively enabling said readout means to effect transmission of the stored data pulses from said shift register during said assigned time slot, stuff pulse means for generating a stuff pulse in a time slot whenever said indicating means indicates that less than a predetermined number of said stored data pulses are stored in said shift register during said time slot, and encoder means for providing coded signals having discrete predetermined electrical characteristics for each different data signal as input thereto and coded signals for the input stuff pulses having an electrical characteristic which is different than the electrical characteristics of the coded data signals.

5. A system as set forth in claim 4 in which said indicating means includes a first means for counting the data pulses input to said shift register, a second means for counting the data pulses output from said shift register, and subtractor means for providing a signal, indicating the difference in said counts in said first and second means.

6. A system as set forth in claim 4 in which said encoder means includes a three level logic circuit including a first gate means responsive to a stored logic "1" data pulse from said readout means to provide a first logic signal output and responsive to a stored logic "0" data pulse from said readout means to provide a second logic signal output, and second gate means responsive to a signal derived from said indicating means which indicates less than a predetermined number of data pulses stored in said shift register to provide a stuff signal at a third level.

7. A system as set forth in claim 6 which includes read clock means for providing a read signal to said first and second gate means, and which includes a third gate means controlled by said read clock means to advance said indicating means with each read out of a stored data pulse from said shift register.

8. A system as set forth in claim 4 in which said stuff pulse means includes means for establishing stuff pulse generation for a given period, and means for completing said period even with reception of a data pulse during said period.

9. A system as set forth in claim 4 in which said elastic store means includes a timing recovery circuit for initiating a timing pulse from each incoming digital signal, and means for connecting said timing pulse to said shift register and to said indicating means.

10. In a digital time division switching system having a plurality of digital terminal devices, each digital terminal device comprising digital transmitter means and digital receiver means, each digital transmitter means including buffer means for storing data pulses received from a data pulse source which provides a stream of data pulses, means for providing time slots in a periodic pattern at a rate higher than the pulse rate in said data pulse stream, switching means for selectively connecting one of said digital transmitter means to one of said digital receiver means during at least one of said time slots, means for effecting selective transmission of the stored data pulses from said buffer means in at least one of said time slots, means for generating a stuff pulse in said one of said time slots responsive to the number of data pulses stored in said buffer means during such time slot being less than a predetermined number, encoder means for providing coded signals having discrete predetermined electrical characteristics for each different data signal as input thereto and coded signals for the input stuff pulses having an electrical characteristic which is different than the electrical characteristics of the coded data signals, and circuit means in said digital receiver means responsive to the encoded stuff pulses and data pulses to regenerate only the data pulses at a uniform pulse rate.

11. In a digital time division switching system in which signals are transmitted from digital transmitter means to digital receiver means in at least one assigned time slot, said digital transmitter means having first buffer means for storing the data pulses input from a data pulse source, and means for effecting transmission to said digital receiver means of signals having discrete electrical characteristics for the stored data pulses in said first buffer means and alternatively transmission in the same time slot of a stuff pulse having an electrical characteristic different than the electrical characteristics of said data pulses responsive to a number of pulses less than a predetermined number being stored in said first buffer means during said one time slot, second buffer means in said digital receiver means, circuit means including decoder means having first means for providing a signal output responsive to receipt of the coded signals having said electrical characteristics, and second means enabled by said first means responsive to receipt of one of said stuff pulses, third means enabled by said first means responsive to receipt of one of the data pulses, and means connected to said second and third means for enabling storage of signals in said second buffer means in response to enablement of said third means only.

12. A system as set forth in claim 11 in which said digital receiver means includes readout means for reading out the data pulses from said second buffer means including means for providing signals indicating the number of pulses stored in said second buffer means, and means responsive to said signals to adjust the rate of readout of signals from said second buffer means.

13. A system as set forth in claim 11 in which said digital receiver means includes readout means for reading the data pulses out of said second buffer means, and a phase locked feedback control circuit for enabling said readout means at a variable rate related to the pulse rate of the data pulses received at said digital transmitter means from a data pulse source.

14. A system as set forth in claim 13 in which said phase locked feedback control includes a digital-to-analog converter connected to continually sample the number of data pulses in said second buffer means, means for filtering the analog output signal, a voltage controlled oscillator operating at a frequency which varies with the value of said analog signal, and means for controlling said readout means to operate at a rate determined by the frequency of said oscillator.

15. A system as set forth in claim 14 in which said means for controlling said readout means includes a first counter means for counting the pulses fed to said second buffer means, a second counter means for counting the pulses output from said voltage controlled oscillator, and subtractor means for providing a readout signal which indicates the difference in the counts registered in said first and second counter means.

* * * * *